(12) United States Patent
Yamakawa

(10) Patent No.: US 7,796,282 B2
(45) Date of Patent: Sep. 14, 2010

(54) IMAGE FORMING APPARATUS, PRINTING APPARATUS AND IMAGE PROCESSING METHOD

(75) Inventor: Junichi Yamakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1417 days.

(21) Appl. No.: 11/190,963

(22) Filed: Jul. 28, 2005

(65) Prior Publication Data
US 2006/0023247 A1 Feb. 2, 2006

(30) Foreign Application Priority Data
Aug. 2, 2004 (JP) .............................. 2004-225815

(51) Int. Cl.
*G06K 15/00* (2006.01)
*G06T 5/00* (2006.01)
(52) U.S. Cl. ..................................... 358/1.14; 358/3.26
(58) Field of Classification Search ....... 358/1.13–1.18, 358/1.9, 2.1, 400, 401, 444, 404, 443, 448, 358/3.26; 400/76, 61; 396/312
See application file for complete search history.

(56) References Cited

U.S. PATENT DOCUMENTS

| | | | | |
|---|---|---|---|---|
| 6,089,765 | A * | 7/2000 | Mori ............................ | 400/61 |
| 6,166,826 | A * | 12/2000 | Yokoyama .................. | 358/1.16 |
| 7,033,091 | B2 * | 4/2006 | Nakao .......................... | 400/76 |
| 7,206,086 | B2 * | 4/2007 | Ishida ....................... | 358/1.15 |
| 7,307,745 | B2 | 12/2007 | Tanaka ...................... | 358/1.15 |
| 7,426,049 | B2 * | 9/2008 | Peter et al. .................. | 358/1.15 |
| 7,528,973 | B2 * | 5/2009 | Enomoto et al. ........... | 358/1.15 |
| 2003/0202021 | A1 * | 10/2003 | Manduley ...................... | 347/2 |
| 2004/0133516 | A1 * | 7/2004 | Buchanan et al. ............. | 705/42 |

FOREIGN PATENT DOCUMENTS

| | | |
|---|---|---|
| CN | 1264862 A | 8/2000 |
| JP | 2001-209521 | 8/2001 |
| JP | 2002-178613 | 6/2002 |
| JP | 2002-297332 | 10/2002 |
| JP | 2003-216367 | 7/2003 |
| JP | 2006043962 | * 2/2006 |
| KR | 10-0223217 | 10/1999 |
| KR | 2003-68435 | 8/2003 |

OTHER PUBLICATIONS

Chinese Office Action, dated Sep. 7, 2007, regarding Application No. 200510088912X.
Japanese Office Action issued in the counterpart application No. 2004-225815, dated Feb. 12, 2010—2 pages.

* cited by examiner

*Primary Examiner*—Jerome Grant, II
(74) *Attorney, Agent, or Firm*—Fitzpatrick, Cella, Harper & Scinto

(57) ABSTRACT

An image forming apparatus, printing apparatus and image processing method are provided that enable simple execution of reprinting of an image by selecting a history of a reprintable image from a printing history of a printing apparatus that is displayed on an operations screen. In the case of the printing history of an image that was printed by the copying machine 1001, it is first determined whether or not reprinting of the image that was printed is authorized. When it was determined as a result that reprinting of the image in question is authorized, a URL showing the storage destination of the image is stored and a reprint button 1110 showing that reprinting of the image is authorized is displayed together with printing history information associated with the URL on an operations screen 2013 of a console 2012.

21 Claims, 13 Drawing Sheets

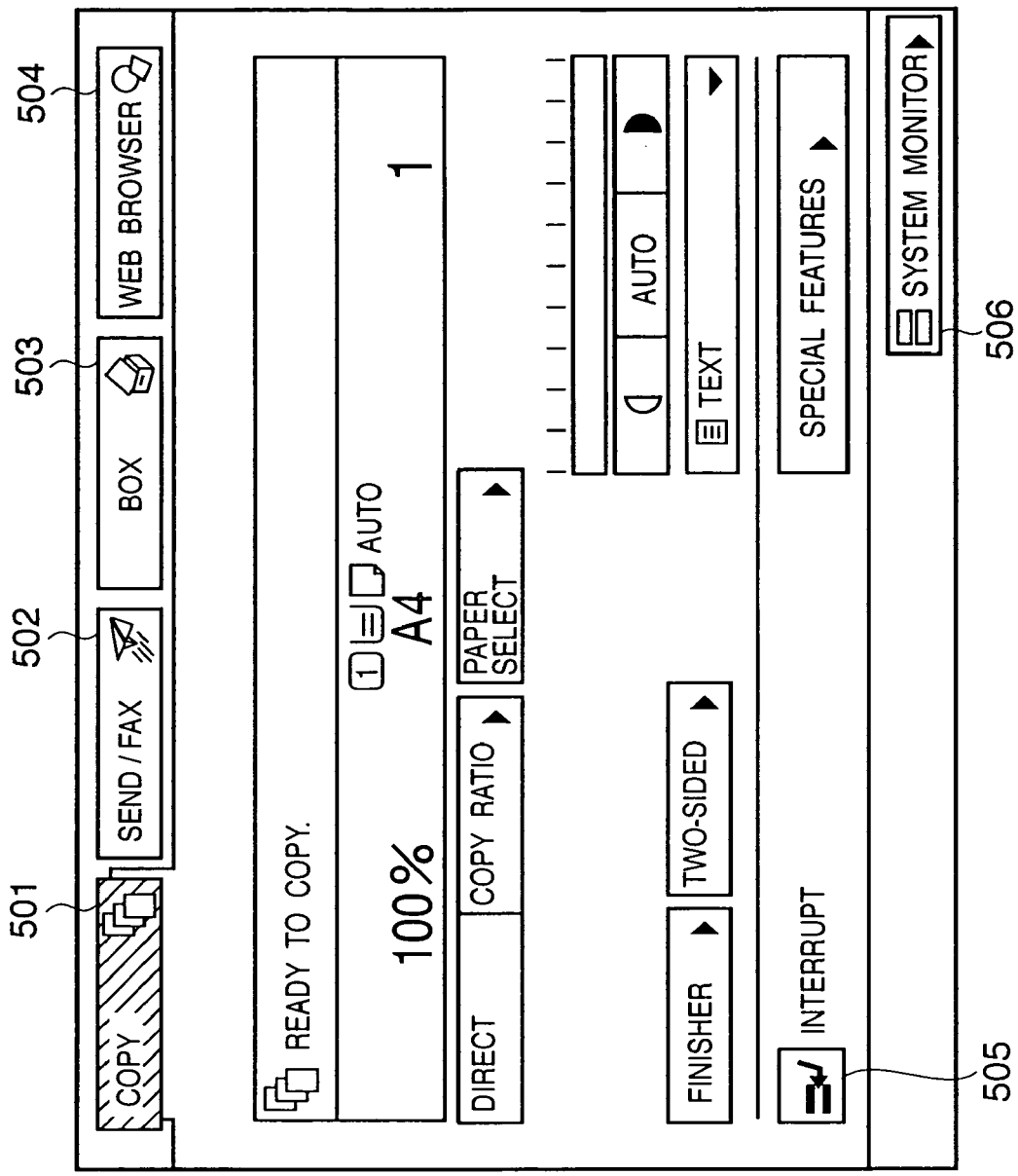

F I G. 10
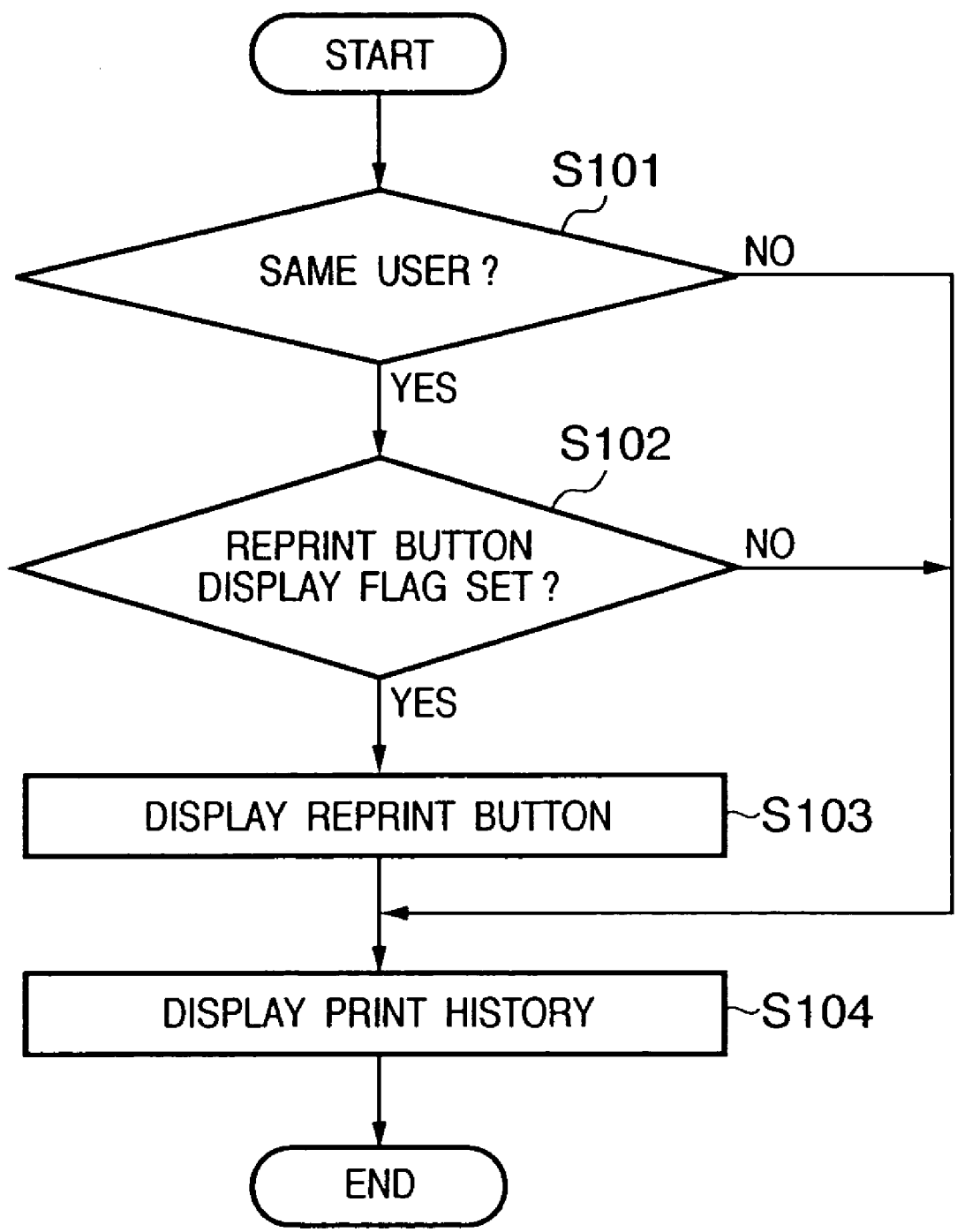

IMAGE FORMING APPARATUS, PRINTING APPARATUS AND IMAGE PROCESSING METHOD

FIELD OF THE INVENTION

The present invention relates to an image forming apparatus, a printing apparatus and an image processing method, and more particularly to an image forming apparatus, a printing apparatus and an image processing method that reprint an image that was printed after being acquired from an external device through a network.

BACKGROUND OF THE INVENTION

In recent years, multi-function peripherals that are based on digital copying machines with numerous added functions have been brought into practical use. For example, various functions such as a function that performs facsimile communication using a scanner and printer that are originally provided on a digital copying machine, a function that expands coded data sent from a computer into bitmap data and prints out the data using the printer, a function that sends over a network an image that was read using a scanner, or a function that prints an image that was delivered through a network using a printer are added to the digital copying machines.

Meanwhile, upsizing of the consoles of multi-function peripherals is proceeding and the display is no longer confined to a display for setting the operation of functions that utilize a scanner or printer. For example, it has become possible to carry out operation of a remote device on a network by use of the operations screen, to utilize the display to monitor the state of the remote device, and to utilize a built-in browser to display the contents of a website. For example, see Japanese Patent Laid-Open No. 2002-178613.

As described in the foregoing, when printing from a built-in browser in the conventional multi-function peripherals, data that is managed by a server or the like specified by a URL can be acquired and subjected to rendering to perform printing. However, in the conventional multi-function peripherals, although the page name, printing date and time or the printer's name or the like can be displayed as the printing history, it is not been possible to reprint from a built-in browser by referring to a print job on the basis of the printing-history. More specifically, even when performing reprinting of a job for which printing was performed once from a built-in browser, it has been necessary to reset the same job again, including performing settings to enter the URL and other settings.

SUMMARY OF THE INVENTION

The present invention has been proposed to solve the conventional problems, and has as its objects to provide an image processing apparatus, printing apparatus and image processing method that can select the history of a reprintable image from the printing history of a printing apparatus that is displayed on an operations screen to enable simple execution of reprinting of the image in question.

In order to solve the above problems, an image processing apparatus of this invention comprises:

a determination unit, adapted to determine whether or not reprinting of an image that was printed by a printing unit is authorized;

a history acquisition unit, adapted to acquire a printing history information of the printing unit;

a storage unit, adapted to store a reference information that shows a storage destination of the image when it was determined by the determination unit that reprinting of the image is authorized; and a display unit, adapted to relate a reprint authorization information that shows that reprinting of the image is authorized with the reference information, and display the reprint authorization information together with the printing history information.

In order to solve the above problems, a printing apparatus of this invention comprises:

an image acquisition unit, adapted to acquire an image as a printing object;

a printing unit, adapted to print the image;

a determination unit, adapted to determine whether or not reprinting of the image is authorized;

an acquisition unit, adapted to acquire printing history information of the printing unit;

a storage unit, adapted to store a reference information that shows a storage destination of the image when it was determined by the determination unit that reprinting of the image is authorized; and a display unit, adapted to relate reprint authorization information that shows that reprinting of the image is authorized with the reference information to display the reprint authorization information together with the printing history information.

In order to solve the above problems, a printing apparatus of this invention comprises:

an image acquisition unit, adapted to acquire an image as a printing object on the basis of a reference information;

a printing unit, adapted to print the image that was acquired by the image acquisition unit;

a storage unit, adapted to store a printing history from the printing unit together with the reference information that was used when acquiring the image with the image acquisition unit; and a control unit, adapted to perform control so as to newly acquire an image as a printing object using the image acquisition unit in accordance with a reference information that is stored in association with the printing history and print the image with the printing unit, when an instruction was made for reprinting based on a printing history stored in the storage unit.

In order to solve the above problems, an image processing method of this invention comprises:

a determination step that determines whether or not reprinting of an image that was printed by a printing apparatus is authorized;

a history acquisition step that acquires a printing history information of the printing apparatus;

a storage step that stores a reference information showing a storage destination of the image when it was determined by the determination step that reprinting of the image is authorized; and a display step that relates a reprint authorization information showing that reprinting of the image is authorized with the reference information, and displays the reprint authorization information together with the printing history information.

In order to solve the above problems, an image processing method of this invention comprises:

an image acquisition step that acquires an image as a printing object;

a printing step that prints the image with a printing apparatus;

a determination step that determines whether or not reprinting of the image is authorized;

a history acquisition step that acquires a printing history information of the printing apparatus;

a storage step that stores in a storage device a reference information showing a storage destination of the image when it was determined by the determination step that reprinting of the image is authorized; and a display step that relates a reprint authorization information showing that reprinting of the image is authorized with the reference information, and displays the reprint authorization information together with the printing history information.

In order to solve the above problems, an image processing method of this invention comprises:

an image acquisition step that acquires an image as a printing object on the basis of a reference information;

a printing step that prints an image that was acquired by the image acquisition unit with a printing apparatus;

a storage step that stores a printing history from the printing step together with the reference information used when acquiring an image in the image acquisition step; and a control step that performs control so as to newly acquire an image as a printing object through the image acquisition step in accordance with a reference information that is stored in association with the printing history and print the image with a printing apparatus, when an instruction was made for reprinting based on a printing history that was stored in the storage step.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5A is a view showing an example of an operations screen (initial screen of a copy function) displayed on a LCD display portion 2013 of the console 2012 shown in FIG. 4;

FIG. 10 is a flowchart to illustrate operations to display a printing history with respect to a print job from the browser;

DETAILED DESCRIPTION OF THE PREFERRED EMBODIMENTS

Figure 1:
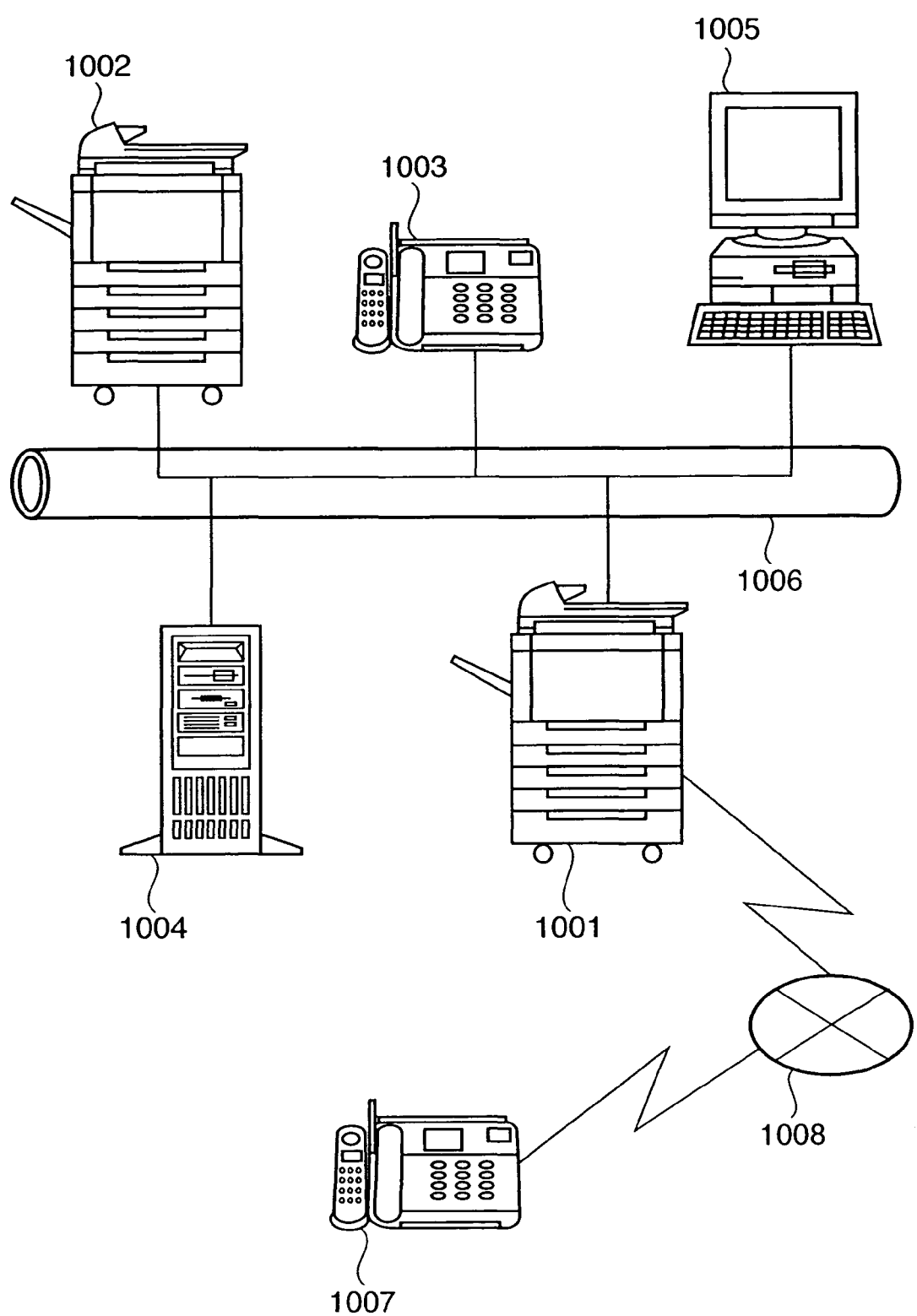
FIG. 1 is a view that schematically shows the network configuration of an image forming system equipped with a multi-function peripheral of an embodiment of this invention.

Hereunder an image forming system that includes a multi-function peripheral of one embodiment of this invention is described in detail referring to the drawings.

FIG. 1 is a view that schematically shows the network configuration of an image forming system equipped with a multi-function peripheral of an embodiment of this invention. In the following embodiment, a description is made taking a copying machine 1001 equipped with a data transmission function as one example of a multi-function peripheral.

As shown in FIG. 1, a copying machine 1001 is contained on (connected to) a LAN 1006 that is implemented by an Ethernet (registered trademark) or the like together with a copying machine 1002 that is equipped with functions that are equivalent to those of the copying machine 1001, a facsimile 1003, a database/mail server 1004 and a client computer 1005. The copying machine 1001 is also contained on (connected to) a public circuit (WAN) 1008 together with a facsimile 1007.

The copying machine 1001 as the multi-function peripheral of this embodiment is equipped with a copy function, a scanner function and a facsimile function. The copying machine 1001 also includes a data transmission function that sends image data acquired by reading a document image to the respective devices on the LAN 1006. Further, the copying machine 1001 is equipped with a PDL function and is capable of receiving a PDL image that was sent with a print instruction by the client computer 1005 or the like that is connected on the LAN 1006, and printing the received PDL image. In this connection, the copying machine 1001 is capable of storing an image read by the copying machine 1001 itself or a PDL image designated by another computer or the like that is connected on the LAN 1006 in a specified mailbox area within a storage area on the copying machine's own hard disk or the like. The copying machine 1001 is also capable of printing out an image that is stored in the mailbox area in question.

Further, the copying machine 1001 is capable of receiving data read by the copying machine 1002 through the LAN 1006 and storing the received data on a hard disk inside the copying machine 1001 or printing out the data. Furthermore, the copying machine 1001 is capable of receiving an image from the database/server 1004 through the client computer 1005 and the LAN 1006 and storing or printing out the image.

The facsimile 1003 is capable of receiving data read by the copying machine 1001 through the LAN 1006 and sending the received data to an external device.

The database/mail server 1004 is a server device having a function that receives data that was read by the copying machine 1001 through the LAN 1006 and stores the received data in a database or sends the data using electronic mail.

The client computer 1005 is capable of connecting to the database/mail server 1004 through the LAN 1006 to acquire desired data from the database/mail server 1004 and display the data. The client computer 1005 is also capable of receiving data that was read by the copying machine 1001 through the LAN 1006 and manipulating or editing the received data.

The facsimile 1007 is capable of receiving data that was read by the copying machine 1001 or the like through the public circuit (WAN) 1008 and printing out the received data.

Figure 2:
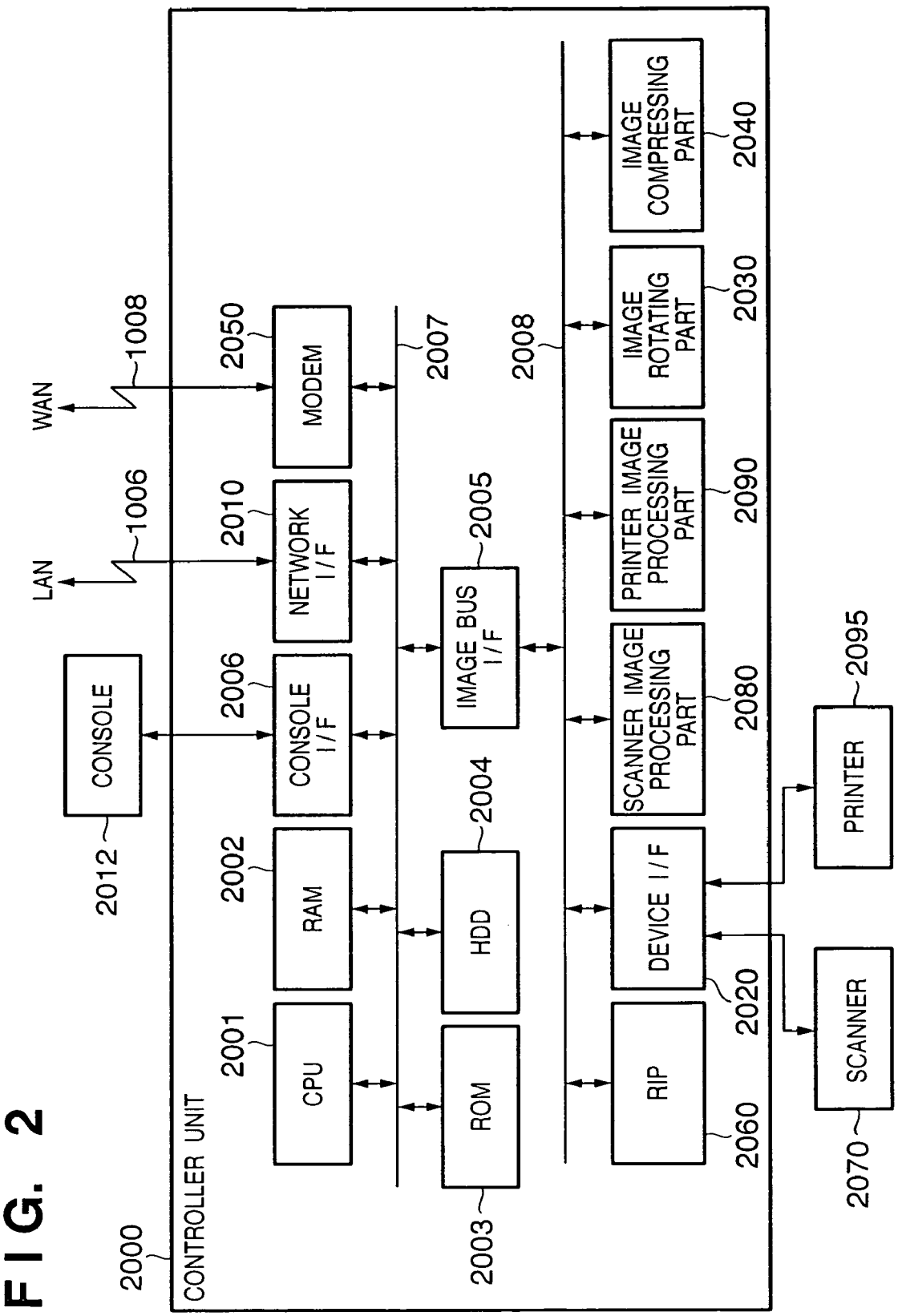
FIG. 2 is a block diagram showing the configuration of the principal parts of a copying machine as the multi-function peripheral of an embodiment of this invention.

FIG. 2 is a block diagram showing the configuration of the principal parts of a copying machine as the multi-function peripheral of an embodiment of this invention.

In FIG. 2, a controller unit 2000 connects to a scanner 2070 as an image input device and a printer 2095 as an image output device and performs control for implementing a copy function that uses the printer 2095 to print out image data that was read by the scanner 2070. The controller unit 2000 also connects to the LAN 1006 or the public circuit (WAN) 1008 to conduct control for carrying out input and output of image information or device information with an external device or the like.

Next, constructional details of the controller unit 2000 will be described specifically. First, the controller unit 2000 has a CPU 2001. The CPU 2001 starts up an operating system (OS) by use of a boot program stored on a ROM 2003. The CPU 2001 executes various kinds of processing by executing applications stored on a hard disk drive (HDD) 2004 on the OS. A RAM 2002 is used as a working area of the CPU 2001.

In addition to functioning as the working area of the CPU 2001, the RAM 2002 also provides an image memory area for temporarily storing image data. As well as storing the aforementioned application programs, the HDD 2004 also stores image data.

The CPU 2001 is connected with the ROM 2003, the RAM 2002, the HDD 2004, a console interface (console I/F) 2006, a network interface (network I/F) 2010, a modem 2050 and an image bus interface (image bus I/F) 2005 through a system bus 2007.

The console interface 2006 is an interface with the console 2012 that has a touch panel, and it outputs to the console 2012 image data for displaying on the touch panel of the console 2012. The console I/F 2006 also sends information that was input by a user using the console 2012 to the CPU 2001.

The network I/F 2010 is connected to the LAN 1006 and carries out input and output of information with an external device on the LAN 1006. The modem 2050 is connected to the public circuit 1008 and carries out input and output of information with an external device through the public circuit 1008.

The image bus I/F 2005 is a bus bridge for converting a data structure, and it is connected to an image bus 2008 for transferring image data at high speed with the system bus 2007. The image bus 2008 comprises a PCI bus or IEEE 1394 or the like. On the image bus 2008 are connected (contained) a raster image processor (hereunder, referred to as "RIP") 2060, a device interface (device I/F) 2020, a scanner image processing part 2080, a printer image processing part 2090, an image rotating part 2030, a thumbnail creating part 2035 and an image compressing part 2040.

The RIP 2060 is a processor that expands a PDL code into a bitmap image. The scanner 2070 and the printer 2095 are connected to the device I/F 2020. The device I/F 2020 performs synchronous/asynchronous conversion of image data.

The scanner image processing part 2080 carries out correction, manipulation and editing processing for input image data. The printer image processing part 2090 performs printer correction or resolution conversion of image data for print output. The image rotating part 2030 rotates image data. The image compressing part 2040 compresses multivalued image data into JPEG data or the like and binary image data into JBIG, MMR or MH data or the like, and also performs decompression processing for these kinds of compressed data.

Figure 3:
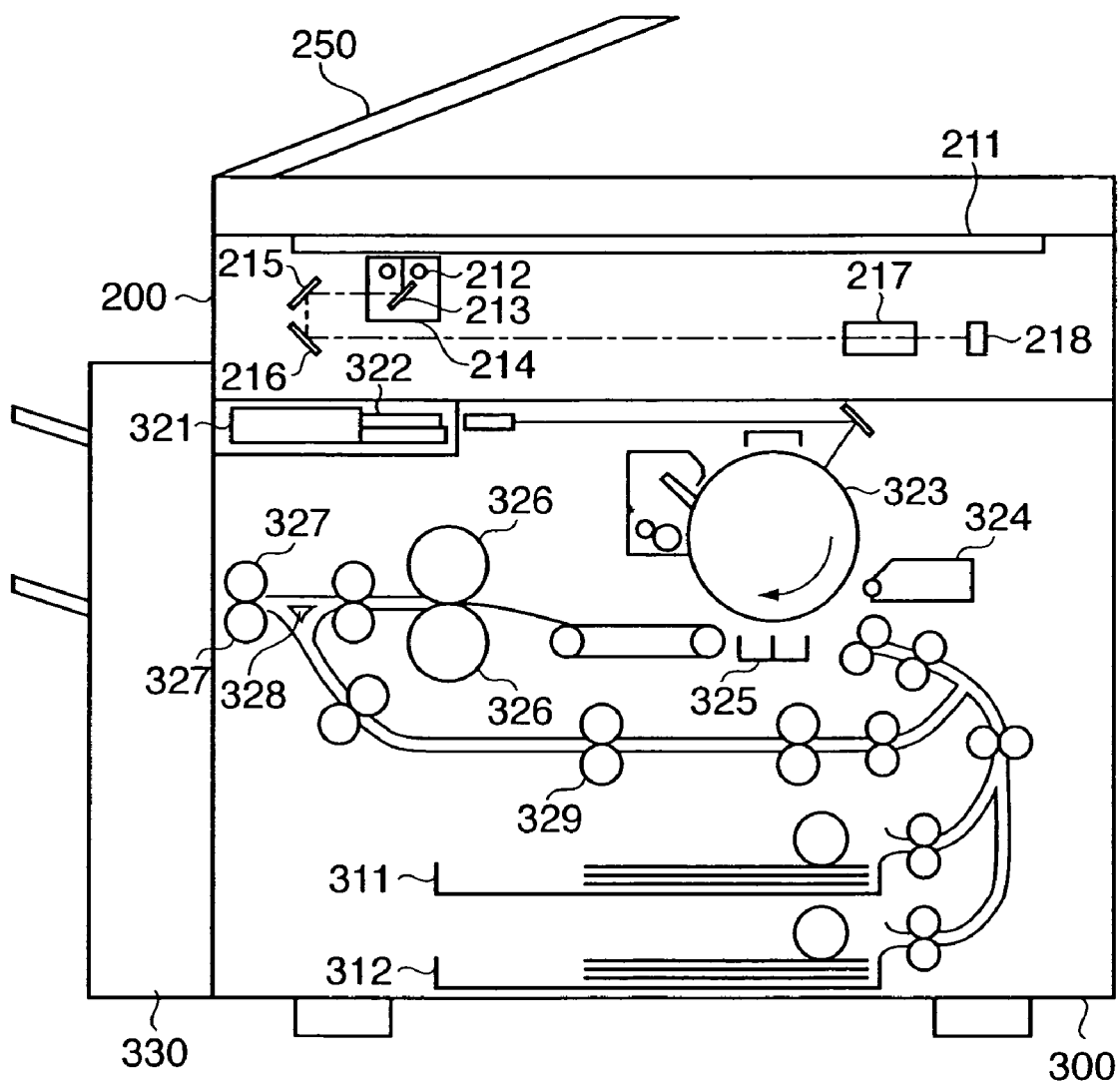
FIG. 3 is a view that schematically shows the hardware configuration of a scanner 2070 and a printer 2095 of a copying machine 1001 shown in FIG. 2.

FIG. 3 is a view that schematically shows the hardware configuration of the scanner 2070 and the printer 2095 of the copying machine 1001 shown in FIG. 2. As shown in FIG. 3, the copying machine 1001 of this embodiment comprises the scanner 2070 and the printer 2095 in an integrated configuration as a reader portion 200 and a printer portion 300, respectively.

The scanner 2070 is equipped with a document sheet feeding unit 250. The document sheet feeding unit 250 feeds the original sheets of a document onto a platen glass 211 one sheet at a time in order starting from the first sheet. Each time an operation to read an original sheet is completed the original sheet that was fed is delivered from the platen glass 211 to a delivery tray (not shown).

When an original sheet is fed onto the platen glass 211, the scanner 2070 (reader portion 200) lights a lamp 212 and starts the movement of a movement unit 213. By movement of the movement unit 213, a reading scan is conducted that reads the original sheet on the platen glass 211. During this reading scan, reflected light from the original sheet is guided to a CCD image sensor (hereunder, referred to as "CCD") 218 via mirrors 214, 215 and 216 and a lens 217, whereby the image on the original page is formed on an imaging surface of the CCD 218. The CCD 218 converts the image that was formed on its imaging surface into electric information, and the electric information is then input into the controller unit 2000 after undergoing a predetermined processing.

The printer 2095 (printer portion 300) has a laser driver 321. The laser driver 321 drives a laser emitting portion 322 on the basis of image data that was input from the controller unit 2000. As a result, laser beams that correspond with image data are emitted from the laser emitting portion 322, to irradiate the laser beams onto a photosensitive drum 323 while being scanned.

A static latent image is formed on the photosensitive drum 323 by the irradiated laser beams, and this static latent image is visualized as a toner image by toner that is supplied from a developing device 324. Then, in synchrony with the timing of irradiation of the laser beams, recording paper is fed between the photosensitive drum 323 and a transfer portion 325 through a conveying route from cassette 311 or 312, and the toner image on the photosensitive drum 323 is transferred by the transfer portion 325 onto the thus-fed recording paper.

A recording paper onto which a toner image was transferred is conveyed to a pair of fixing rollers (a heating roller and a pressure roller) 326 via a conveying belt. The pair of fixing rollers 326 then apply heat and pressure to the conveyed recording paper to fix the toner image that is on the recording paper onto the recording paper. After the recording paper has passed through the pair of fixing rollers 326, it is delivered to a delivery unit 330 by a pair of delivery rollers 327.

The delivery unit 330 is composed of a sheet processing apparatus that is capable of implementing post-processing such as collating and stapling with respect to the delivered recording paper. Further, when a two-sided recording mode is set, after the recording paper was conveyed as far as the pair of delivery rollers 327, the direction of rotation of the pair of delivery rollers 327 is reversed to guide the recording paper to a conveying route for sheet re-feeding 329 by use of a flapper 328. Recording paper that was led to the conveying route for sheet re-feeding 329 is re-fed between the photosensitive drum 323 and the transfer portion 325 at the above described timing to transfer a toner image onto the rear surface of the recording paper.

Figure 4:
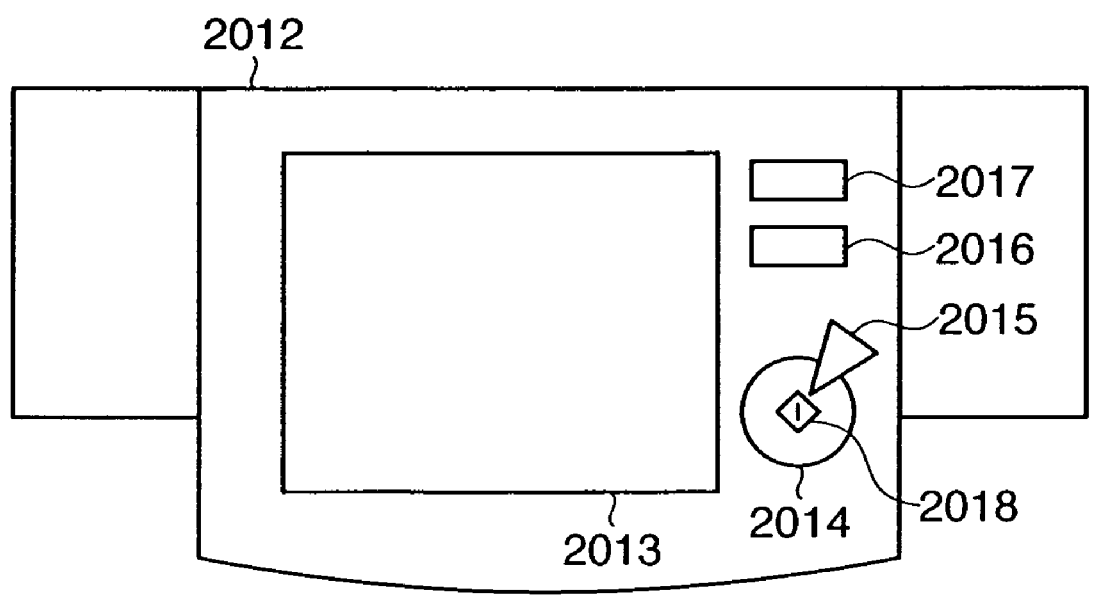
FIG. 4 is an outside drawing of a console 2012 of the copying machine 1001 shown in FIG. 2.

Next, the configuration of the console 2012 is described. FIG. 4 is an outside drawing of the console 2012 of the copying machine 1001 shown in FIG. 2. As shown in FIG. 4, on the LCD display portion 2013 a touch panel sheet is affixed on top of the LCD. The LCD display portion 2013 displays an operations screen of the system comprising the copying machine 1001. Further, when a key displayed on the LCD display portion 2013 is touched or pressed by a user or the like, the LCD display portion 2013 conveys that positional information to the CPU 2001 of the controller unit 2000.

A start key 2014 is used when starting an operation to read a document image or the like. In the center of the start key 2014 is provided, for example, a two-colored LED 2018 of the colors green and red. Whether or not the start key 2014 is in a state in which it can be used is displayed by light emission of the LED of the respective color. A stop key 2015 functions to stop operations that are in progress and an ID key 2016 is used when entering the user ID of a user. A reset key 2017 is used when initializing settings from the console.

FIG. 5A is a view showing an example of an operations screen (initial screen of a copy function) displayed on the LCD display portion 2013 of the console 2012 shown in FIG. 4. As shown in FIG. 5A, at the top portion of the operations screen, for example, are displayed touch keys which display a tab for each of a plurality of functions such as a copy key 501, a send/FAX key 502, a box key 503 and a web browser key 504. In this connection, a program for displaying a web browser is incorporated into the ROM 2003 inside the controller unit 2000. It is possible for a user to cause a web browser to be displayed on the LCD display portion 2013 by inputting an instruction from the console 2012.

As described above, FIG. 5A shows the initial screen of a copy function that is displayed when the touch key of the copy key 501 was pressed. For example, as shown in FIG. 5A, the status of the copy function is displayed in an area 507 in which a message "Ready to copy" is displayed, and under that area is an area that displays the copy ratio, the selected paper source, the number of deposits and the like.

Further, as touch keys for setting the operating modes of the copy function, as shown in FIG. 5A, "Direct", "Copy Ratio", "Paper Select", "Finisher", "Two-sided", "Interrupt", "Text", a "left arrow key" and a "right arrow key" that are used to adjust the copying density and which correspond to lightening the density and darkening the density, respectively, and an "Auto key" that automatically adjusts the density, and the like are displayed. Specifying of other operating modes that can not be displayed on the initial screen is enabled by pressing a "Special Features key" to display settings screens in a hierarchical fashion on the screen.

A display area 505 is an area that displays the status of the copying machine 1001. In the display area 505 are displayed, for example, an alarm message such as that for a paper jam or a status message that shows that a PDL printing operation is in progress when PDL printing is being performed. When a user presses a System Monitor key 506 that is provided inside the display area 505, a screen displaying device information of the copying machine 1001 or a screen displaying a print job status is displayed (not shown). A job can be cancelled by use of this screen.

In contrast, when the send/FAX key 502 is pressed a settings screen (not shown) is displayed for sending an image that was read by the copying machine 1001 to another device on the LAN 1006 by e-mail or FTP transmission or by FAX using the public circuit 1008.

Further, when the box key 503 is pressed a settings screen (not shown) is displayed for storing an image that was read by the copying machine 1001 in a mailbox area on the hard disk (HDD) 2004, printing specified image data that is stored in the mailbox area, or sending specified image data to a device on the LAN 1006.

Figure 5B:
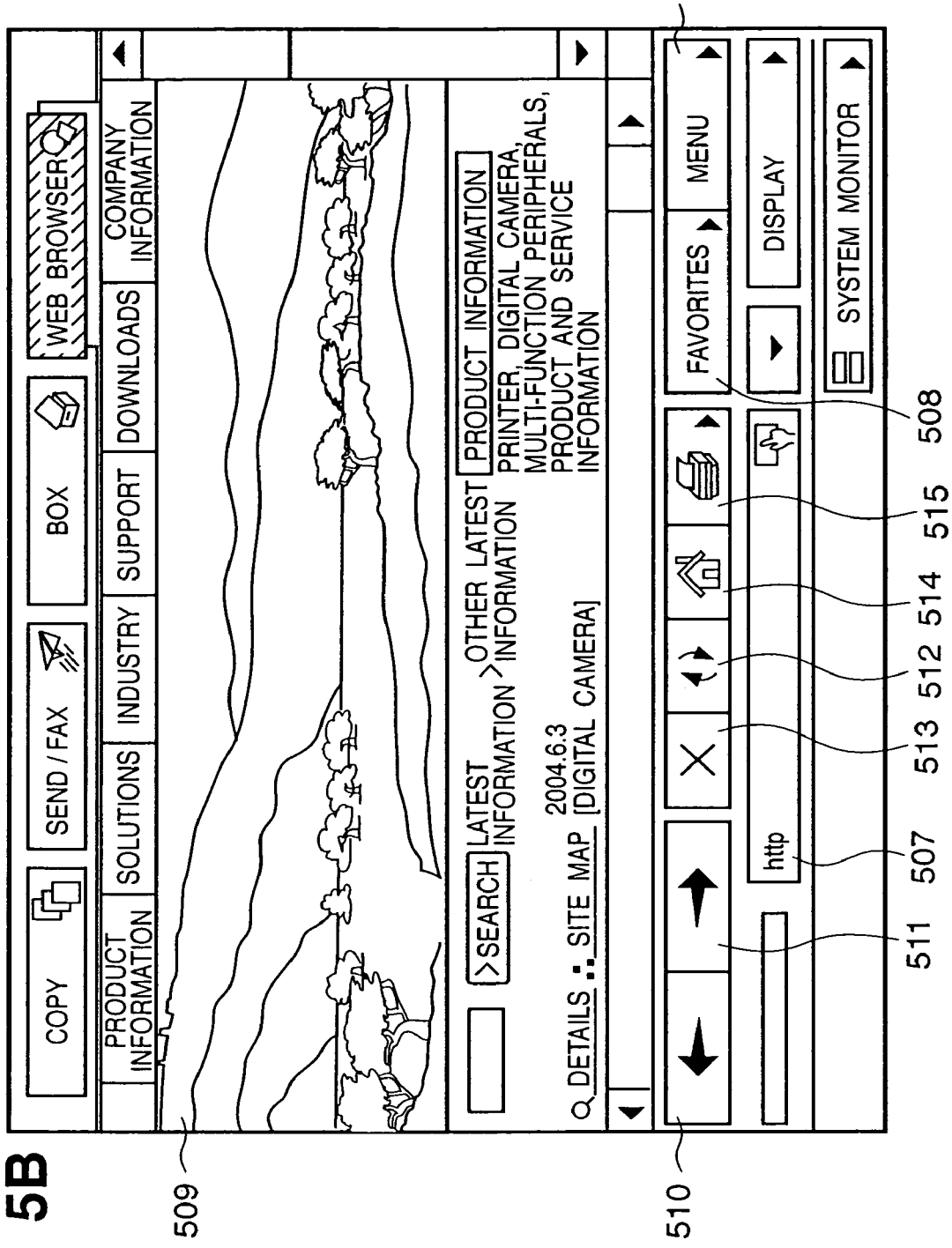
FIG. 5B is a view showing an example of an operations screen (initial screen of a web browser function) displayed on a LCD display portion 2013 of the console 2012 shown in FIG. 4.

When the web browser key 504 is pressed a browser startup screen is displayed. FIG. 5B is a view showing an example of an operations screen (initial screen of the web browser function) displayed on a LCD display portion 2013 of the console 2012 shown in FIG. 4. In FIG. 5B, the field of a URL input portion 507 is pressed by a user to specify a URL to access a page. When the field in question is pressed, a soft keyboard is displayed to enable the user to specify a URL. In this connection, a configuration may be adopted so that the system administrator has authority to set whether or not a user is allowed to specify a URL.

Further, in FIG. 5B, a Favorites key 508 is used to register, organize and display specific URLs and the like. The display area 509 is an area for displaying various contents. A Back key 510 is a key for returning the page to the immediately preceding page, and a Forward key 511 is a key for advancing to the next page.

In FIG. 5B, an Update key 512 is a key for reloading the page that is currently displayed to display the reloaded page. A Cancel key 513 is a key for canceling reading of a page. A Home key 514 is a key for shifting to a previously set home page.

A Print key 515 is a key for printing the page that is currently displayed. When a user presses this button, a print settings dialog is displayed. In the print settings dialog a screen is displayed for setting which way to print a frame and for setting printing-related settings (number of copies, two-sided, collate and the like). Printing is started by pressing a Start Print button displayed on this screen. A Menu key 516 is a key for displaying a screen for changing the display magnification ratio of the screen, changing the character size, changing the character code and the like.

Figure 6:
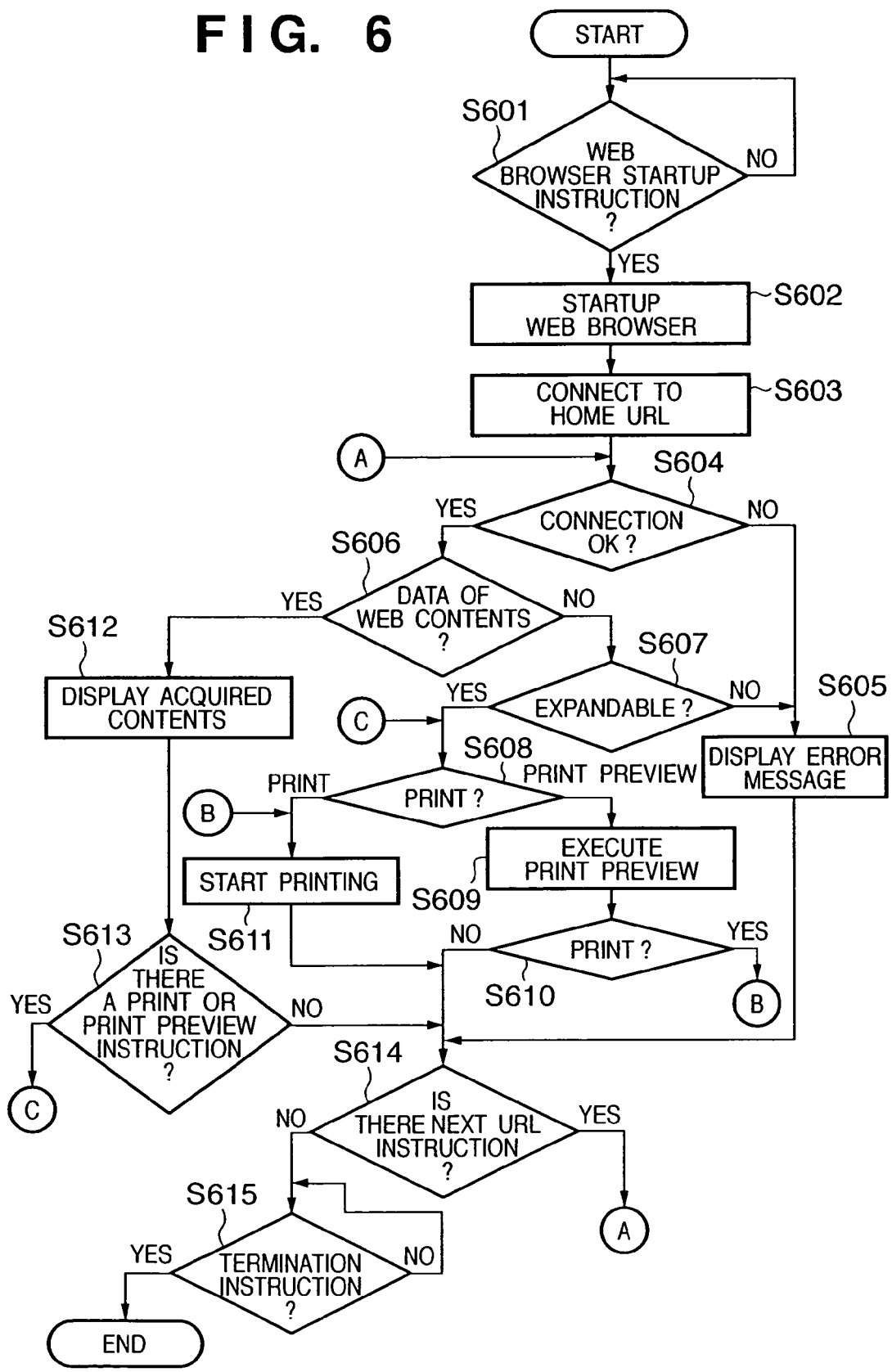
FIG. 6 is a flowchart to illustrate the operations sequence of a web browser of the copying machine 1001 of an embodiment of this invention.

Next, operations of the browser that take place when a user pressed the web browser key 504 are described. FIG. 6 is a flowchart for describing the operations sequence of a web browser of the copying machine 1001 of one embodiment of this invention.

First, it is determined whether or not an instruction was made to activate the web browser (step S601). When it is determined that an instruction was made to activate the web browser (Yes), the web browser is activated (step S602). A connection is then made to the URL (home URL) to be connected to when activating the web browser (step S603).

Next, it is determined whether or not the above connection was successful (step S604). When the connection could not be made (No), an error message is displayed (step S605). In contrast, when the connection was successful (Yes), it is determined whether or not the acquired data is data of web contents (step S606). If it is determined as a result that the data is not data of web contents (No), it is then determined whether or not the data can be expanded inside the copying machine 1001 (step S607). If the data can not be expanded (No), an error message is displayed (step S605).

In contrast, when it is determined in step S607 that the data can be expanded (Yes), it is determined whether or not the instruction is one to conduct printing or to conduct a print preview (step S608). When a print preview instruction was received, a print preview is displayed (step S609), and the apparatus then waits for the next instruction to determine whether or not the instruction is a print instruction (step S610). When the next instruction is a print instruction, printing is started (step S611).

When it was determined that the data acquired in step S606 is data of web contents (Yes), the browser displays the acquired data in the display area 509 of the operations screen shown in FIG. 5B (step S612). Thereafter, it is determined whether or not either a print instruction or a print preview instruction was input as the next instruction (step S613).

When either a print instruction or a print preview instruction was input (Yes), the operation returns to step S608 to perform the above described processing. However, although the size of the recording paper to be used when conducting printing or a print preview is specified here, since there are many cases in which the layout only gives consideration to displaying the data of web contents on the display apparatus and does not give consideration to printing, in some cases the data of web contents cannot fit on the specified recording paper size and required information is thus omitted. Therefore, in this embodiment, the print preview and printing is performed after automatically performing layout editing such as changing the alignment of objects so that they fit in the selected recording paper size. Further, editing is conducted not only to fit the data onto the recording paper, but also to print an image object on the next page when the image object exists at the boundary of two pages when printing a plurality of pages. Unlike the case of a text object, this is done to prevent the contents of an image from becoming unclear due to the image object spreading across page boundaries. In contrast, when neither a print instruction nor a print preview instruction was received (No), when the printing that was started in step S611 was completed, when a print instruction was not received in step S610 (No), or when an error message was displayed in step S605, it is determined whether or not another URL was specified (step S614).

When another URL was specified (Yes), the operation returns to step S604 to determine whether or not it is possible to connect to the other URL in the same manner as when determining the connection to the home URL. In contrast, when another URL was not specified, it is determined whether or not a termination instruction was received (step S615). When it is determined that there was a termination instruction (Yes), the browser operations are terminated.

Figure 7:
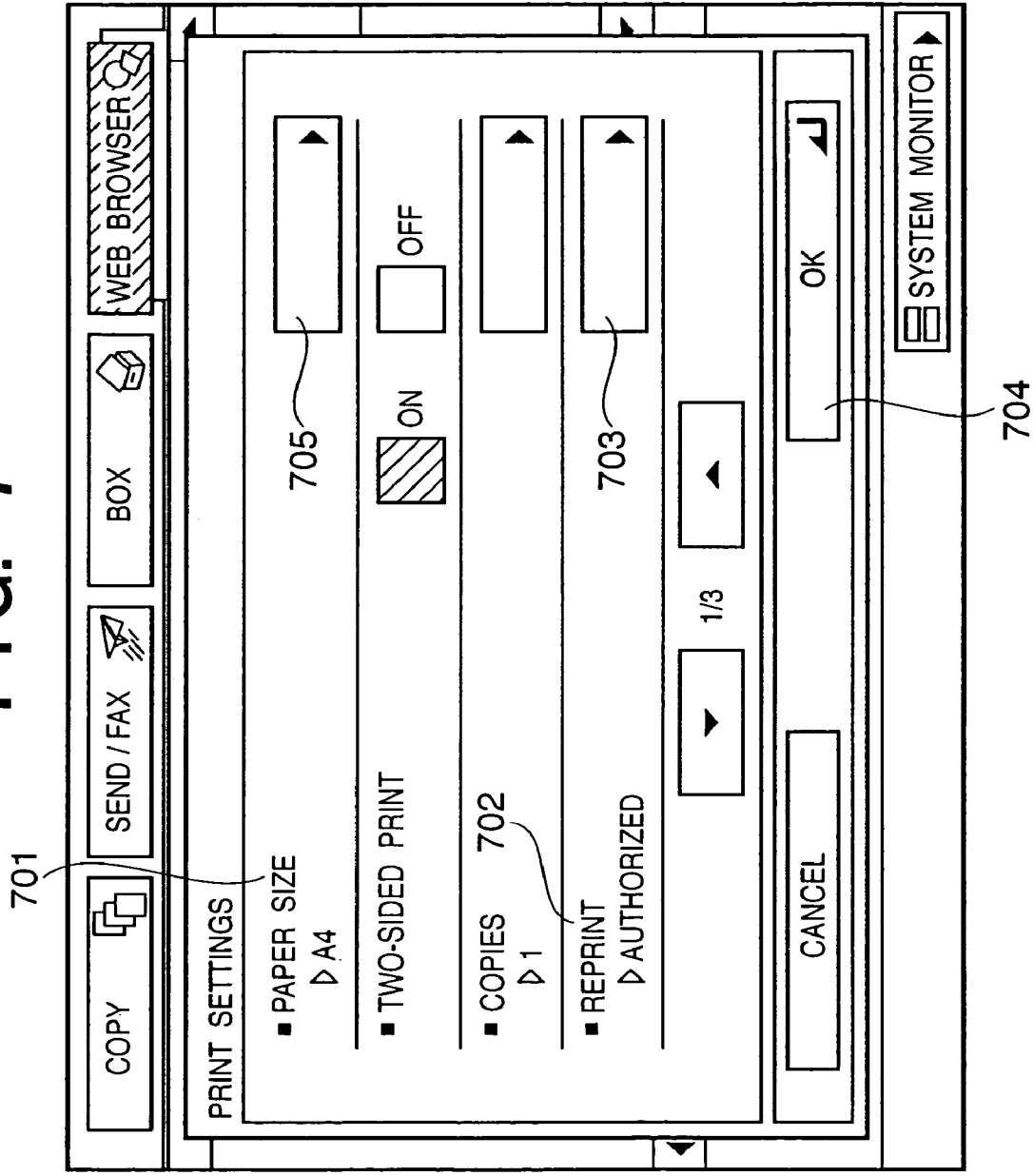
FIG. 7 is a view showing an example of a print settings screen that is displayed when a print key 515 of FIG. 5B was pressed.

Next, a printing operation performed by a web browser is described in detail. FIG. 7 is a view showing an example of a print settings screen that is displayed when the print key 515 of FIG. 5B was pressed. More specifically, when the user displays a page that the user wants to print on the browser and presses the print key 515, the print settings screen shown in FIG. 7 is displayed. In FIG. 7, reference numeral 701 denotes a paper size settings area, in which A4-size paper is currently set. The paper size can be changed by pressing the button on the right side to enter the new settings. Reference numeral 702 denotes a reprint settings area, in which the current setting is one that authorizes reprinting. To change this setting to a setting to inhibit reprinting, a user presses a Change Settings key 703 to change the settings to inhibit reprinting. When the print settings are completed, the user presses an OK key 704 to display the print screen shown in FIG. 8.

Figure 8:
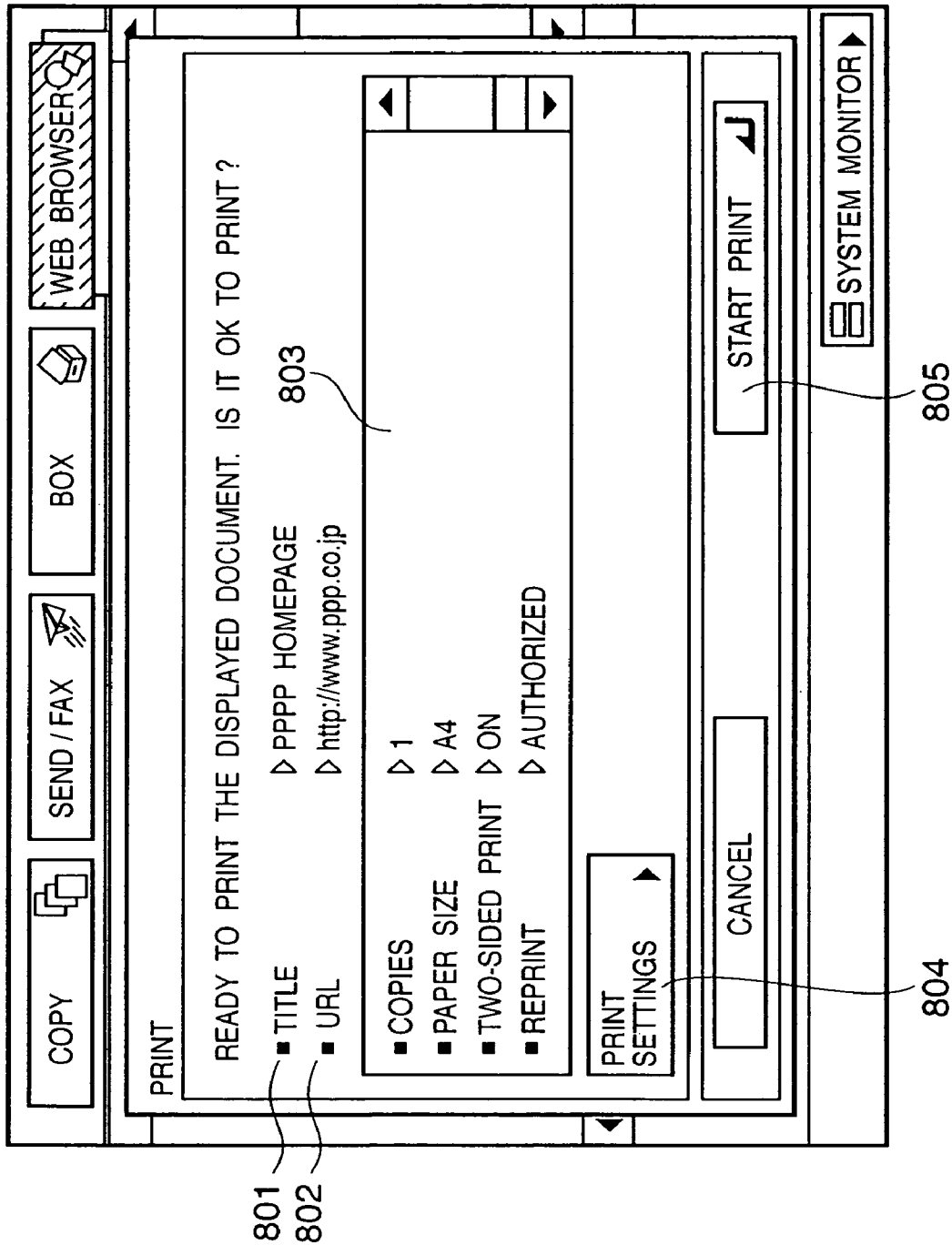
FIG. 8 is a view showing an example of a print screen that is displayed when an OK key 704 of FIG. 7 was pressed.

FIG. 8 is a view showing an example of a print screen that is displayed when the OK key 704 of FIG. 7 was pressed. In FIG. 8, reference numeral 801 denotes a title display, reference numeral 802 denotes a URL display, and reference numeral 803 denotes a display to set the number of copies. When a user wants to change the print settings, the user can press a Print Settings key 804 to return to the print settings screen shown in FIG. 7. After confirming the settings on this screen, the user presses a Start Print key 805 to start printing. In this connection, a configuration may be adopted in which only designation of a target URL and specification of printing is performed without displaying an image of the printing object.

Figure 9:
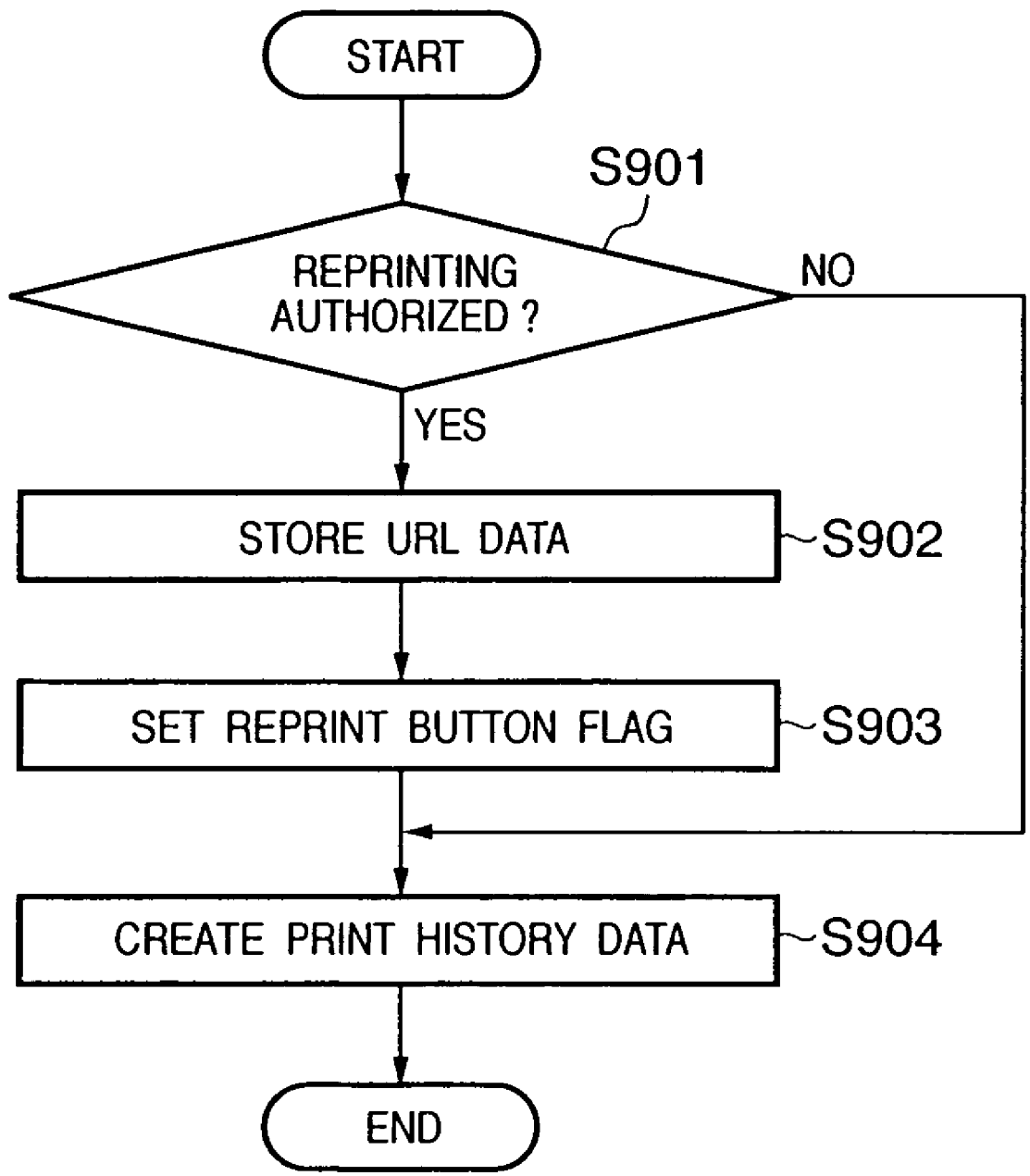
FIG. 9 is a flowchart to illustrate the sequence of operations to create printing history data of a browser print job.

Next, a case of reprinting a print job from the browser by use of a printing history screen is described. FIG. 9 is a flowchart for explaining the sequence of operations to create printing history data for a browser print job; More specifically, after a print job was completed, it is determined whether or not a setting was made to authorize reprinting of the print job (step S901). When it is determined as a result that a setting was not made to authorize reprinting (No), printing history data is created in the same manner as for an ordinary print job (step S904).

In contrast, when a setting was made to authorize reprinting of the print job (Yes), the URL data at the time of printing is stored (step S902). However, the URL itself is not displayed in the printing history. As a result, it is possible to conceal from a third party a target image (page) that was printed in the past. Subsequently, a reprint button display flag is set so that a Reprint button is displayed when displaying the printing history (step S903). The processing then proceeds to step S904 to create printing history data in the same manner as for an ordinary print job.

Next, processing to display a printing history screen is described. FIG. 10 is a flowchart to illustrate operations to display the printing history for a print job from the browser. First, it is determined whether or not the user that is displaying the printing history is the same as the user that designated the print job from the browser (step S101). When it is determined as a result that the two users are not the same (No), the printing history is displayed in the same manner as for an ordinary print job on the basis that the user is not a user for which reprinting is authorized (step S104). More specifically, in this case a setting can be made to enable reprinting of only a page for which it is acceptable if the page is reprinted by another person using the same user name or user ID or the like, and reprinting can not be performed by other users since the button in question is not displayed. In this connection, a configuration may be adopted which does not determine whether or not the user names of individual users are the same, and for example, allows the use of a common history within the same group by using a group ID, such as a department ID.

When it was determined in step S101 that it is the same user (Yes), it is then determined whether or not the reprint button display flag is set (step S102). When the reprint button display flag is set (Yes), the reprint button is displayed (step S103). The processing then proceeds to step S104 to display the printing history as described above. In contrast, when the reprint button display flag is not set in step S102 (No), the processing proceeds to step S104 to display the printing history.

Figure 11:
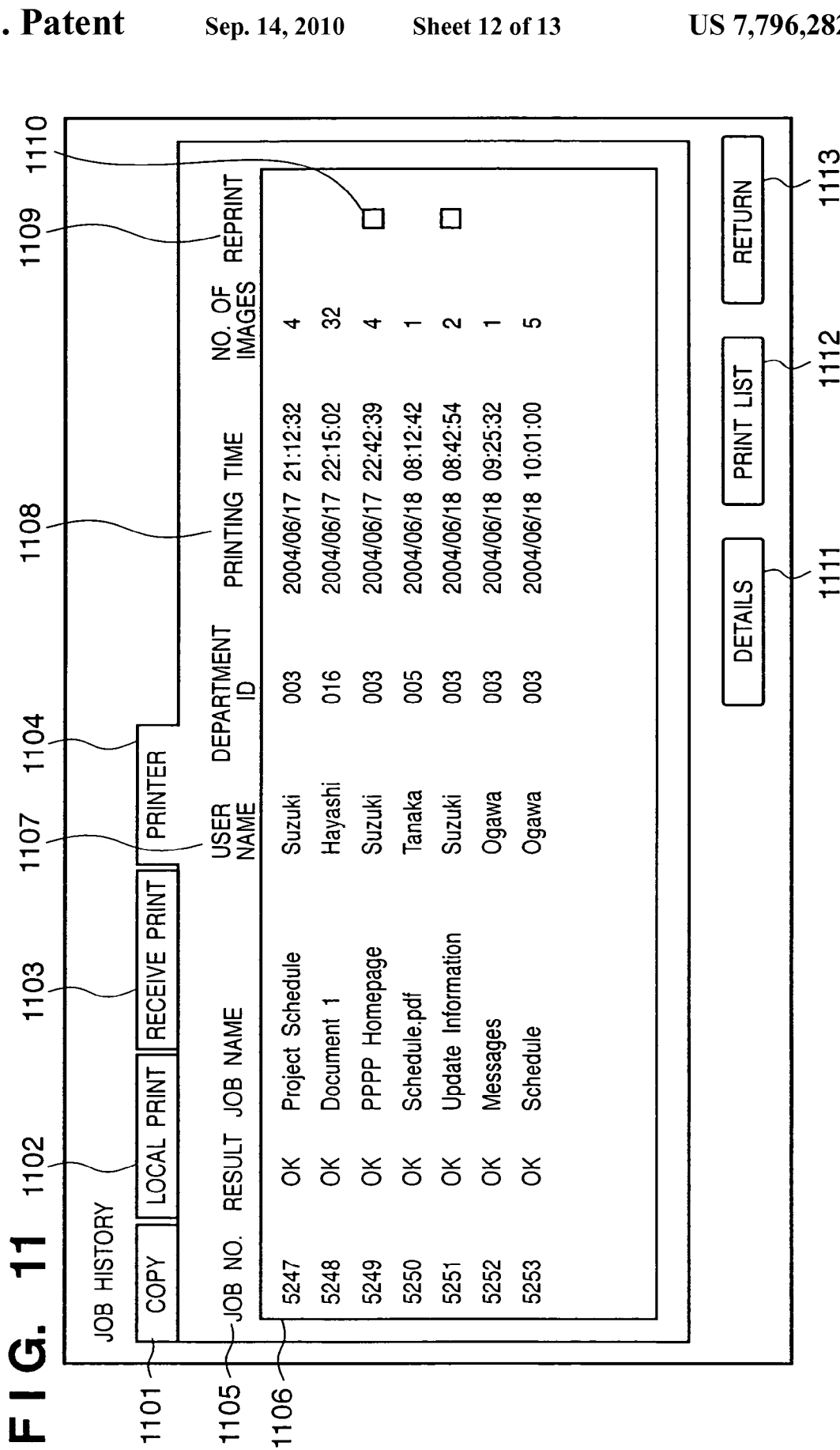
FIG. 11 is a view showing an example of a printing history screen that is displayed on the operations screen shown in FIG. 2.

FIG. 11 is a view showing an example of a printing history screen that is displayed on the operations screen shown in FIG. 2. By selecting one of tabs 1101 to 1104 on the printing history screen shown in FIG. 11, a user displays the printing history of copy jobs, local print jobs, received jobs or printer jobs, respectively. In FIG. 11, the printing history of printer jobs is displayed.

In the printing history screen shown in FIG. 11, reference numeral 1105 denotes a display column for job number, reference numeral 1106 denotes a display column for job name, reference numeral 1107 denotes a display column for user name, reference numeral 1108 denotes a display column for printing time, and reference numeral 1109 denotes a display column for reprint. Reference numeral 1110 denotes a Reprint button, reference numeral 1111 denotes a Details display button that displays detailed information of a selected print job, reference numeral 1112 denotes a Print List button to print the displayed printing history list, and reference numeral 1113 denotes a button for returning to the previous screen.

Figure 12:
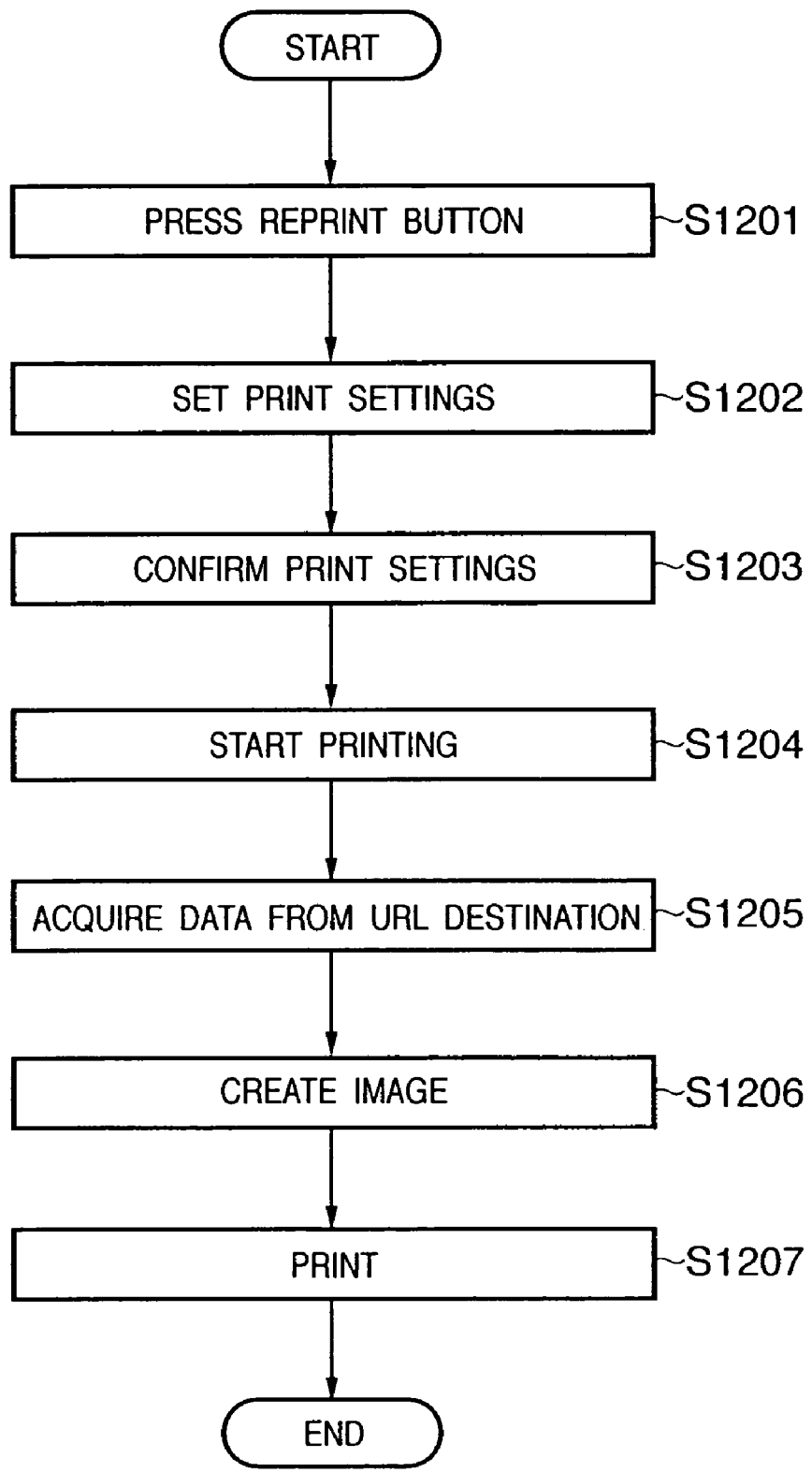
FIG. 12 is a flowchart for describing the sequence of reprinting processing of a browser print job from the printing history screen shown in FIG. 11.

FIG. 12 is a flowchart for describing the sequence of reprinting processing for a browser print job from the printing history screen shown in FIG. 11. First, a user presses the Reprint button 1110 of the printing history screen shown in FIG. 11 (step S1201). As a result, the print settings screen shown in the aforementioned FIG. 7 is displayed. Subsequently, the user enters the print settings using the print settings screen (step S1202). When the user presses the OK button 704 of the print settings screen, the print settings confirmation screen shown in the aforementioned FIG. 8 is displayed.

After confirming the setting contents on the print settings confirmation screen shown in FIG. 8, the user presses the Start Print button 805 (step S1203). Thus, printing according to the set contents starts (step S1204). A request to acquire data is then made to the server of a specified URL and the contents data are acquired (step S1205). Next, the contents data acquired by a HTML rendering engine are analyzed and expanded into printable bitmap data to generate an image, and the data is then written in an image memory (step S1206). Thereafter, the bitmap data that was written into the image memory is sent to the printer 2095 to conduct printing (step S1207).

Other Embodiment

Although in the above described embodiment a printing history that includes the existence or non-existence of reprinting authorization was displayed on the operations screen of the copying machine 1001, a configuration may be adopted which displays this information on a browser of the client computer 1005. In this case, data relating to the printing history can be displayed by designating the address of the copying machine 1001 from the browser using a web server function of the controller unit 2000 of the copying machine 1001.

Thus, as described in the foregoing, according to this invention a configuration may be adopted that not only displays a history by designating the web server of the copying machine from a browser incorporated into the copying machine 1001 but also designates the copying machine 1001 from a browser on the client computer 1005 on the network to display the printing history and perform reprinting of a browser print job from there.

In the above embodiment, because the contents are printed after being reacquired on the basis of the URL that is kept in each history, it is possible to print up-to-date information when a reprint instruction is made at the time of reprinting. However, in some cases a user may desire to reprint the contents that existed at the time of the previous printing.

Thus, when performing print processing, a configuration may be adopted that stores printed images on the HDD 2004 or the like in association with the respective printing history, so that when reprinting was specified the user can select whether to print the image that existed at the time of the previous printing or to reacquire the contents on the basis of the URL to perform printing. Further, instead of making a selection at the time of reprinting, a configuration may be adopted in which a setting is previously set to print either of these images.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to this invention, by selecting the history of a reprintable image from the printing history of a printing apparatus that was displayed on an operations screen, reprinting of the image in question can be simply executed. Further, it is also possible to execute reprinting after acquiring up-to-date information on the basis of reference information.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-225815 filed Aug. 2, 2004, which is hereby incorporated by reference herein.

What is claimed is:

1. An image forming apparatus, comprising:
   a determination unit, adapted to determine whether or not reprinting is authorized of an image printed by a printing unit;
   a history acquisition unit, adapted to acquire printing history information of the printing unit;
   a storage unit, adapted to store reference information that shows a storage destination of the image when it is determined by the determination unit that reprinting of the image is authorized; and
   a display unit, adapted to display the printing history information,
   wherein the display unit displays the printing history information and reprint authorization information, when it is determined by the determination unit that reprinting of the image is authorized, and displays the printing history information but does not display the reprint authorization information, when it is determined by the determination unit that reprinting of the image is not authorized.

2. The image forming apparatus according to claim 1, further comprising:
   a designating unit, adapted to designate the reprint authorization information that was displayed by the display unit to designate reprinting of the image; and
   a reprinting unit, adapted to reprint with the printing unit an image based on a reference information that corresponds to the reprint authorization information.

3. The image forming apparatus according to claim 1, further comprising an authentication unit, adapted to authenticate whether or not reprinting of the image is an operation by an authorized user, wherein the display unit displays the reprint authorization information together with the printing history information based on a condition that the authentication unit authenticated that the operation is by a user that was authorized to conduct reprinting.

4. The image forming apparatus according to claim 1, wherein the storage unit stores as the reference information a URL showing a storage destination of the image that is stored in an external device connected to the apparatus through a network.

5. The image forming apparatus according to claim 4, wherein the image is data of web contents that is managed by the external device.

6. A printing apparatus, comprising:
   an image acquisition unit, adapted to acquire an image as a printing object;
   a printing unit, adapted to print the image;
   a determination unit, adapted to determine whether or not reprinting of the image is authorized;
   an acquisition unit, adapted to acquire printing history information of the printing unit;
   a storage unit, adapted to store reference information that shows a storage destination of the image when it is determined by the determination unit that reprinting of the image is authorized; and
   a display unit, adapted to display the printing history information
   wherein the display unit displays the printing history information and reprint authorization information, when it is determined by the determination unit that reprinting of the image is authorized, and displays the printing history information but does not display the reprint authorization information, when it is determined by the determination unit that reprinting of the image is not authorized.

7. The printing apparatus according to claim 6, further comprising:
   a designating unit, adapted to designate the reprint authorization information that was displayed by the display unit to designate reprinting of the image; and
   a reprinting unit, adapted to reprint an image based on reference information that corresponds to the reprint authorization information.

8. The printing apparatus according to claim 6, further comprising an authentication unit, adapted to authenticate whether or not reprinting of the image is an operation by an authorized user, wherein the display unit displays the reprint authorization information together with the printing history information based on a condition that the authentication unit authenticated that the operation is by a user that was authorized to conduct reprinting.

9. The printing apparatus according to claim 6, wherein the storage unit stores as the reference information a URL showing a storage destination of the image that is stored in an external device connected to the apparatus through a network.

10. The printing apparatus according to claim 9, wherein the image is data of web contents that is managed by the external device.

11. The printing apparatus according to claim 6, further comprising: an editing unit, adapted to edit a layout so that an image acquired by the image acquisition unit fits on a recording paper that is used when printing the image with the printing unit.

12. A printing apparatus, comprising:
    an image acquisition unit, adapted to acquire an image as a printing object based on reference information;
    a printing unit, adapted to print the image acquired by the image acquisition unit;
    a storage unit, adapted to store a printing history from the printing unit together with the reference information used when acquiring the image with the image acquisition unit; and
    a control unit, adapted to perform control so as to newly acquire an image as a printing object using the image acquisition unit in accordance with reference information that is stored in association with the printing history and to print the image with the printing unit, when an instruction is made for reprinting based on a printing history stored in the storage unit, wherein the control unit does not authorize reprinting of the image but outputs the printing history of the image when it is determined that reprinting of the image is not authorized.

13. The printing apparatus according to claim 12, further comprising a memory unit, adapted to store the image that was acquired by the image acquisition unit, wherein, when an instruction was made for reprinting based on the printing history, the control unit controls to newly acquire an image as a printing object using the image acquisition unit in accordance with reference information that is stored in association with the printing history, and to print the image with the printing unit, or the control unit controls to print with the printing unit an image that is stored in the memory unit in association with the printing history.

14. The printing apparatus according to claim 12, further comprising an authentication unit, adapted to authenticate whether or not reprinting of the image is an operation by an authorized user, wherein the control unit authorizes the reprinting based on a condition that the authentication unit authenticated that the reprinting is an operation by an authorized user.

15. The printing apparatus according to claim 12, wherein the storage unit stores as the reference information a URL showing a storage destination of the image that is stored in an external device connected to the apparatus through a network.

16. The printing apparatus according to claim 12, wherein the image is data of web contents that is managed by the external device.

17. An image processing method, comprising:
a determination step that determines whether or not reprinting of an image printed by a printing apparatus is authorized;
a history acquisition step that acquires printing history information of the printing apparatus;
a storage step that stores reference information showing a storage destination of the image when it was determined in the determination step that reprinting of the image is authorized; and
a display step that displays the printing history information,
wherein the display step displays the printing history information and reprint authorization information, when it is determined in the determination step that reprinting of the image is authorized, and displays the printing history information but does not display the reprint authorization information, when it is determined in the determination step that reprinting of the image is not authorized.

18. An image processing method, comprising:
an image acquisition step that acquires an image as a printing object;
a printing step that prints the image with a printing apparatus;
a determination step that determines whether or not reprinting of the image is authorized;
a history acquisition step that acquires printing history information of the printing apparatus;
a storage step that stores in a storage device reference information showing a storage destination of the image when it was determined in the determination step that reprinting of the image is authorized; and
a display step that displays the printing history information
wherein the display step displays the printing history information and reprint authorization information, when it is determined in the determination step that reprinting of the image is authorized, and displays the printing history information but does not display the reprint authorization information, when it is determined in the determination step that reprinting of the image is not authorized.

19. An image processing method, comprising:
an image acquisition step that acquires an image as a printing object based on a reference information;
a printing step that prints an image acquired by the image acquisition unit with a printing apparatus;
a storage step that stores a printing history from the printing step together with the reference information used when acquiring an image in the image acquisition step; and
a control step that performs control so as to newly acquire an image as a printing object through the image acquisition step in accordance with reference information that is stored in association with the printing history and to print the image with a printing apparatus, when an instruction is made for reprinting based on a printing history that was stored in the storage step, wherein the control step does not authorize reprinting of the image but outputs the printing history of the image when it is determined that reprinting of the image is not authorized.

20. A non-transient computer-readable storage medium storing a program for causing a computer to execute the image processing method according to claim 17.

21. A printing apparatus, comprising:
a printing unit, adapted to print an image;
a determination unit, adapted to determine whether or not reprinting of the image printed by the printing unit is possible;
an acquisition unit, adapted to acquire printing history information of the printing unit;
a storage unit, adapted to store reference information indicating a storage destination of the image when it is determined by the determination unit that reprinting of the image is possible; and
a display unit, adapted to display the printing history information,
wherein the display unit displays the printing history information and reprint authorization information, when it is determined by the determination unit that reprinting of the image is possible, and displays the printing history information but does not display the reprint information, when it is determined by the determination unit that reprinting of the image is not possible.

* * * * *